United States Patent

Wirz

[11] 3,753,084
[45] Aug. 14, 1973

[54] APPARATUS FOR THE RAPID ELECTROMETRIC DETERMINATION OF ION ACTIVITY

[76] Inventor: Wily Walter Wirz, Austrasse 9, Meilen, Switzerland

[22] Filed: Apr. 26, 1971

[21] Appl. No.: 137,437

[30] Foreign Application Priority Data
Apr. 24, 1970 Switzerland.......................... 6235/70
Apr. 19, 1971 Germany................... P 21 18 876.1

[52] U.S. Cl............................. 324/30 C, 204/195 G
[51] Int. Cl........................ G01n 27/42, B01k 3/00
[58] Field of Search................. 324/29, 30 R, 30 B, 324/30 A, 30 C; 204/1 R, 1 T, 195 G

[56] References Cited
UNITED STATES PATENTS
3,224,433  12/1965  Von Dalebor...................... 324/30 C OTHER PUBLICATIONS
Pettit, F. S.; Thermodynamic and Elect. . . . ; J. of Phy. Chem.; Vol. 68; No. 1; Jan. 1964; pp. 9-13; copy 9-13.

Primary Examiner—Alfred E. Smith
Assistant Examiner—Ernest F. Karlsen
Attorney—Karl W. Flocks

[57] ABSTRACT

An apparatus for the rapid electrometric determination of ionic activities, especially the pH-value, p(Me)-value or p(L)-value of substances, by means of an ion sensitive or ion specific sensor of low or extremely high internal resistance. There is also provided a preferably transistorized amplifier circuit arrangement and an indicator device for the indication of the measurement values in analogue or digital form. According to the invention there is provided as the sensor an electrode measuring chain possessing measuring- and reference electrode means, such electrode-measuring chain exhibiting a clearly defined point of intersection of the isotherms, a constant electrical chain null point, an internal buffer of high buffer capacity and stable slope. A storage vessel is also provided for the measuring chain, and this storage vessel contains an activation solution to maintain said measuring chain under the influence thereof. Fixedly balanced resistor means for said amplifier circuit arrangement control the asymmetrical potential, the electrical null point of the apparatus, the temperature factor of the measuring chain and the amplification factor.

16 Claims, 2 Drawing Figures

APPARATUS FOR THE RAPID ELECTROMETRIC DETERMINATION OF ION ACTIVITY

BACKGROUND OF THE INVENTION

The present invention relates to a new and improved apparatus for high-speed electrometric determination of ion activity, especially the pH-, p(Me)- or p(L)-values of substances, by means of an ion selective or ion specific sensor of low or extremely high internal resistance, a preferably transistorized amplifier circuit arrangement and an indicator device for the indication of the measurement result in analogue or digital form.

As is known the pH-value is a measure of the acid, neutral or alkali reaction of a substance in aqueous solution and is defined by pH = $-\log a_{H_3O^+}$, and the p(Me)-value and p(L)-value are measures for the activity of specific Me- and L-ions (cations and anions).

In order to obtain exact or reasonably exact measurement results during the electrometric determination of ion activity with heretofore known direct indicating devices it is required to calibrate the device before eacn measurement with the aid of standard solutions (calibration buffers) and in the case of prolonged series of measurements to post-calibrate the device. It is required for such measuring devices, for instance a pH-meter that the asymmetric potential of the measuring chain and the deviation of the actual measuring chain slope from the theoretical must be capable of correction. To this end, the electrical null point of the device and a counter-potential derived for instance from the amplifier as well as the amplification factor of the measuring device are generally designed to be variable. Thus, the measuring devices are generally equipped with adjustable or variable voltage dividers which can be manually controlled by rotary knobs. Oftentimes however the adjustment of the electrical null point or zero setting of the device and the taking into account of temperature influences occurs automatically, for instance by means of an electronic control, which in the base of temperature corrections contains a temperature-dependent resistor. Thus the prior art measuring devices always possess an appropriate number of operating elements which, during calibration and post-calibration with the aid of standardized solutions, must be operated in a predetermined manner. Oftentimes there is also provided a selector switch for the adjustment of the different functions. By virtue of these measures which are considered to be absolutely necessary the measurement of, for instance, pH-values, is both cumbersome and time-consuming. Attempts have been made to simplify the use of measuring devices, for instance with the aid of a programmed perforated disc for adjusting the variable voltage divider and/or by diagram or graph-reading scales beneath the measuring device indicator for taking into account the different measurement temperatures. Nonetheless an appreciable progress could not be realized and a decisive simplification in the use of the device, for instance a pH-meter, is also not obtainable as long as the previously discussed requirements are considered absolutely necessary.

Since the use of such devices is complicated and cumbersome as a practical matter the carrying out of measurements regarding ion activity can only be effectively performed by experts or persons who have undergone prolonged training. If the device is used by unskilled or unschooled individuals generally erroneous measurement results and erroneous evaluation results arise owing to errors resulting from improper adjustments and read-out, inexact standardized solutions and erroneous or inaccurate adjustments of the operating elements. Consequently, measurements concerning ionic activity are generally only performed in research and industry, notwithstanding the fact that it would be desirable if in particular pH-measurements were carried out more extensively in a wider field, especially in different businesses, governmental agencies and schools. Thus for instance it would be advantageous and useful to carry out, for example pH-measurements of the water of small and large installations as rapid control of for instance the bathing water in swimming pools and public baths, indoor pools, spring water, underground water, drinking water, water from lakes, and waste water of all types, for all types of laboratories, during washing and flushing processes, for animal husbandry, medicine and biology, for ground samples or probes in agriculture and horticulture, for the control of foodstuffs and food products, and so forth.

SUMMARY OF THE INVENTION

Accordingly, it will be understood from the foregoing that the prior art is still in need of apparatus for the rapid electrometric determination of ion activity in a manner free from the aforementioned disadvantages present in the state-of-the-art equipment. Therefore, a primary object of this invention is to provide novel apparatus of the aforementioned character which effectively and reliably fulfills the existing need in the art and overcomes or at least considerably minimizes the drawbacks existant in the prior art constructions.

Another and more specific object of the instant invention relates to the provision of a new and improved type of apparatus for the rapid or high-speed electrometric determination of ion activity, such apparatus being relatively simple and economical to manufacture, especially easily usable even by inexperienced personnel, and further capable of delivering in practice sufficiently accurate measurement results, and wherein as a practical matter erroneous measurements and erroneous evaluations of the measurement results do not occur, and further wherein the inventive apparatus possesses as usual an ion selective sensor coupled with an amplification circuit arrangement after which there is connected a measuring device.

Now these and still further objects of the invention will become more readily apparent as the description proceeds, and in order to implement the above objects the invention contemplates that the sensor embodies a conventional or known electrode measuring chain possessing a measuring- and reference electrode and having a clear or defined isothermic intersection point, a constant electrical chain null point, an internal buffer of high buffer capacity and stable slope. Furthermore, there is provided for the measuring chain a storage vessel containing an activation or sensitization solution in order to maintain the measuring chain under the influence of the activation solution. Additionally, fixedly balanced or matched resistors are arranged in the electrical circuit of the amplifier for the asymmetrical potential and the electrical null point of the device, for the temperature factor of the measuring chain and the amplification factor or gain.

Electrode measuring chains of the required type are commercially available on the market. Owing to the continuous activation brought about by the activation solution located externally of the reference electrode it is ensured that the asymmetrical potential and the slope of the measuring chain remain constant. After a preliminary or initial calibration, undertaken for instance by the manufacturer, all further measurements take place without the need to perform switching- and calibration operations, and it is not necessary as was heretofore the case to perform at the device correction adjustments while using calibration buffers. The measurement value is read-off directly and interpreted in accordance with tables for the relevant range of use.

It is preferable to use an electrode measuring chain, the reference electrode wire of which is immersed in a conductive electrolyte containing stabilization additives, and in the storage vessel there is filled an activation solution, the chemical composition of which corresponds to or is the same as that of the conductive electrolyte. The purpose of the stabilization additives is to prolong the longevity of the electrode measurement chain, to render the measurement or measuring chain insensitive to different contaminants, to prevent clogging of the membrane or diaphragm of the reference electrode owing to calcification or fungus growth and therefore to ensure that the asymmetrical potential and slope of the measurement chain are constant.

The stabilization additive of the activation solution, also used as conductive electrolyte and potential determining agent for the reference electrode, preferably consists of at least two of the following substances: alkali hydrogen phthalate, alkali tetraborate, alkali phosphate, alkali hydrogen phosphate, thymol, alkylester of hydroxy benzoic acid, alkali benzoate, citric acid, acetic acid, monochloro acetic acid, alkali salt of the acetic acids and the monochloro acetic acids. These additives are free of halogen ions supplied by the potassium chloride in constant concentration of the base electrolyte, and determine the potential of the reference or base system (half cells) as will be further explained hereinafter. Further, the additives are free of heavy metal ions and do not form together with the half cells of the measuring chain any disturbing complex ions.

Simply formulated and effective activation solutions are composed as follows:

| | |
|---|---|
| Base electrolyte, potassium chloride | about 22.0 % |
| Sodium chloroacetate | about 2.8 % |
| Monochloro acetic acid | about 2.0 % | or

| | |
|---|---|
| Base electrolyte, potassium chloride | about 23.0 % |
| Sodium acetate | about 0.8 % |
| Acetic acid | about 0.6 % | or

| | |
|---|---|
| Base electrolyte, potassium- or sodium chloride | 23.5 % |
| Potassium dihydrogen phosphate $KH_2PO_4$ | 0.34 % |
| Disodium hydrogen phosphate $Na_2HPO_4$ | 0.36 % |
| Thymol | 0.01 % |

All three compositions further contain traces of silver chloride for saturation, for Ag/AgCl/KCl-reference electrode parts. The KCl-concentration of the activation solution used within and externally of the reference electrode or single rod-measuring chain, together with the stabilization additives, determine the the stable chain null point of the electrode measuring chain, and there is obtained the precise, one-time calibration, which is also stable throughout a certain temperature range, as will be still further more fully explained hereinafter.

The amplifier circuit arrangement can consist of a known bridge circuit of two amplifiers, each of which is provided with a respective field-effect transistor as the input amplifier element. At the amplifier outputs there is connected an output element for the analogue or digital processing of the output signals and at the output element there is connected an indicator device. The gate electrode of the field-effect transistor of one of the amplifiers of the bridge circuit can be connected with a fixed-balanced voltage divider for the asymmetrical potential and the electrical null point or zero setting of the device and its amplifier output can be connected with the output element by means of a fixedly adjusted, variable resistor for the temperature factor of the measuring chain and the amplification factor.

In order to be able to perform measurements with grounded and non-grounded sample substances the signal input of the amplifier of the bridge circuit containing the fixedly balanced resistors, with network- and housing grounding of the electronic circuit, can be grounded by a capacitor. In order to dampen the switch-in pulse and to render the circuit arrangement symmetrical it is advantageous to connect the gate electrode of the field-effect transistor of the one amplifier of the bridge circuit with the fixedly balanced voltage divider by means of the resistor of an RC-element, and at the other amplifier a capacitor is connected with the gate electrode of its field-effect transistor, this capacitor forming a second RC-element together with the resistance of the electrode of the measuring chain which is coupled with the gate electrode.

In accordance with a particularly simple to operate apparatus the amplifier circuit arrangement with the output element is accommodated in a closed housing in which there is also arranged the storage vessel for the activation solution and the electrode measurement chain. The storage vessel contains a switch mechanism which switches in the amplifier circuit arrangement during removal of the electrode measuring or measurement chain out of the storage vessel and which switches out such amplifier circuit arrangement when introducing the electrode measuring chain.

In accordance with a particularly simple constructional manifestation of switching mechanism there can be provided at the floor or bottom of the storage vessel a silicone rubber profile member which seals in water tight fashion a hollow compartment in which there is arranged a switch which can be actuated by exerting a pressure upon the diaphragm or membrane.

The invention will be explained in its particular and specific aspects in conjunction with an example of carrying out pH-measurements and in conjunction with an embodiment of inventive apparatus of extremely simple constructional design.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
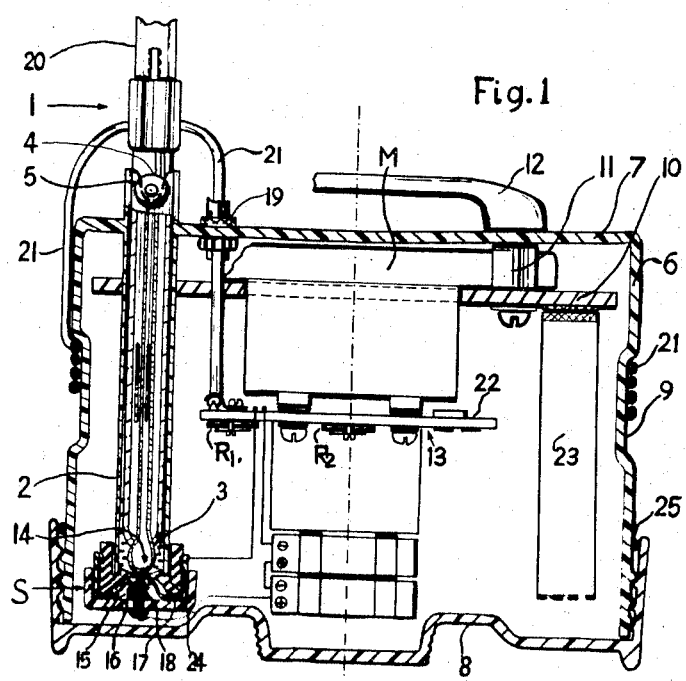
FIG. 1 is a schematic sectional view of a preferred embodiment of apparatus designed according to the inventive teachings and serving to measure pH-values.

Describing now the drawings, and as best seen by referring to FIG. 1, the apparatus illustrated therein and serving to measure pH-values comprises a cylindrical housing 6 which is sealed at the top by a transparent front member 7 and at the bottom is similarly sealed in water tight fashion by a threadably connected floor or bottom 8 equipped with sealing O-rings 25. The cylindrical housing 6 is preferably formed of a synthetic material or plastic. Within the housing 6 there is arranged in upright position a tubular shaped storage vessel 2 or the like. This storage vessel 2 contains an activation solution 3. The electrode measuring or measurement chain 1 is constituted for instance, by a single rod-measuring chain with a glass electrode and a reference electrode wire in the same tube. Mounted at the lower end of the storage vessel 2 is a silicone rubber profile member 24. Arranged centrally of this profile member 24 is a microswitch S which can be actuated by exerting pressure upon the diaphragm or membrane 14. As illustrated for instance, microswitch S can consist of a cylindrical metal portion serving as a stationary switching element 17 in which there is displaceably mounted for up and down movement a movable switch member 16. By means of a pressure spring 18 the movable switch member 16 is pressed with its upper end against the rubber diaphgram of member 24 which presses against membrane 14 of the storage vessel 2.

The microswitch S is closed if the measuring chain 1 in the storage vessel 2 is pulled upwardly at the edge of the tube and the measuring chain 1 bears with its laterally extending glass tube 4 for instance upon such edge. By displacing the measuring chain 1 with its glass tube 4 into the storage vessel 2 within the slot 5 the switch is automatically opened. A carrier or support plate 10 is arranged within the housing 6 beneath the housing front 7. This support plate 10 may be threadably connected for instance, and while using spacer elements 11, from the under side of the housing front 7 with a carrier handle 12 located at such housing front 7, as shown. At the carrier plate 10 there is mounted as the indicator device, for instance a moving coil measuring system M, and further an indicator cartridge containing self-indicating silica gel or some other suitable material for maintaining the interior of the housing dry.

In the illustrated embodiment the amplifier circuit arrangement 13 consists of a printed circuit board or plate 22 equipped with integrated circuit components and is secured to the floor of the housing of the rotary coil measuring system M. Further this amplifier circuit arrangement 13 supports two trimmer resistors $R_1$ and $R_2$ which form the fixedly balanced or matched resistors of the amplifier circuit arrangement, as will be described more fully in detail hereinafter.

A measuring cable 21 leads from the measuring chain 1 to the amplifier circuit arrangement 13. To provide the cable throughpassage there is provided at the housing 6 a water tight and preferably recessed or inset packing sleeve or water tight plug socket 19. When using the packing sleeve 19 and in order to connect the measurement or measuring cable 21 with the measuring chain 1 there can be provided, as indicated at location 20 of FIG. 1, a cable coupling for extremely high resistance. Furthermore, housing 6 has an annular groove 9 at which there can be wound up the measuring cable 21 when the device is not used.

The temperature-dependency of a pH-value in all measurement media is such that in practice it is recommended to basically only perform C in a given temperature range. To this end, the measuring device is advantageously adjusted such that the greatest measurement accuracy exists at the average temperature value of the range. Since most measurements are performed at room temperature the measuring device or apparatus is preferably designed such that it provides the maximum measuring accuracy at 25°C. (or 37°C) and it is prescribed that during measurement of the temperature of a material that its temperature should lie in a range of about 20°C to 30°C (or about 30°C to 45°C). If there is used a measurement amplifier which functions stably and does not exhibit any temperature drift when working in the prescribed temperature range, for instance with temperature fluctuations of 25°C ± 15°C, then, with fixedly balanced resistors $R_1$, $R_2$ the used measuring chain, apart from exhibiting a defined point of intersection of the isotherms, must also possess a stable chain null point, a constant asymmetrical potential and a constant slope, in order to be able to obtain satisfactorily accurate measurement results.

According to the invention measuring chains or measurement chains possessing the previously mentioned properties and commercially available on the market are maintained in the storage vessel 2 under the action of an activation solution 3, so that in each case an electrolyte possessing the special properties is located in the reference electrode component or portion of the measuring chain and externally thereof. The activation solution 3 and the conductive electrolyte in the reference electrode component have the same chemical composition and contain as the stabilization additive, according to the invention, at least two of the already discussed substances. By virtue of the stabilization additives the potential stability (asymmetrical potential) and the longevity of the measuring chain is prolonged and the diaphragm of the reference electrode component of the measuring chain remains intact. Chemical depositions upon the surface of the glass membrane and at the diaphragm of the measuring chain are prevented, there can be used for flushing tap water, and the stabilization additives also retard fungus growth during longer periods of storage in the vessel 2.

For pH-measurements there is preferably used a glass electrode-measuring chain possessing an internal buffer of higher buffer capacity, a clearly defined intersection point of the isotherms at the neighborhood of or at a pH = 7.0 and a constant electrical chain null point $E(T) = 0$ (mV), as well as stable slope or gradient of the measuring electrode. A particularly suitable glass electrode-measuring chain is an impact resistant single rod-measuring chain possessing these properties or characteristics and activation according to the invention.

When working with a single rod-measuring chain and when storing the measuring chain in the storage vessel 2 the glass membrane is also immersed in the activation solution, so that also such is maintained continuously under the same conditions. The potassium chloride concentration of the activation solution is adjusted such that owing to its ion activity there results at the measuring chain a chain null point which is stable throughout a wide temperature range.

The function of the reference electrode- half cell (electrodes of the 2nd type), for instance the silver/silver chloride/KCl, occurs in accordance with the solubility product $L = a_{Ag^+} \cdot a_{Cl^-}$ wherein, $L$ = solubility product, and $a$ = ion activity.

The chloride ion activity is maintained constant by the activation solution with KCl:

$a_{Cl^-} = k$, wherein $a_{Ag^+} = L/k$ is constant. According to the Nernst equation the potential E equals:

$E = E_{Ag^\circ} + R T/n F \ln L/a_{Cl^-}$, wherein,
  $R$ = gas constant
  $F$ = Faraday's constant
  $T$ = temperature
  $n$ = ion valence, and calculated for 25°C results in the equation:

$$E_{(25^\circ C)} = E_{Ag^\circ} + 0.05916 \log L/k,$$

that is, the potential of the reference electrode is constant owing to the high chloride ion concentration in the activation solution and uninfluenced by the additives.

During the series manufacture of certain single rod-measuring chains the asymmetrical potential of the individual chains scatters or varies by a maximum of ± 0.05 pH-units or by ± 3 mV from the electrical chain null point and this stray value can be compensated and allowed to remain without further consideration during the first calibration of the apparatus by adjusting the corresponding fixedly balanced resistor $R_1$. The potential changes of the half cells in the measuring chain, such as for instance the half cell Ag/AgCl/KCl or Hg/Hg$_2$Cl$_2$/KCl, only amount to ± 3 mV during temperature fluctuations of for instance 20°C to 30°C. When using measuring chains with identical half cells in the glassand reference electrode components such deviations are completely compensated.

In order to be able to measure with the utmost accuracy at 25°C, with the previously described apparatus there is adjusted by means of the trimmer resistors $R_1$ and $R_2$ a fixed electrical null point in the neighborhood of or at pH = 7.0 and a slope of 59.1 mV/pH-unit, which from the Nernst equation is equal to the theoretical slope of the glass electrode for 25°C calculated therefrom. With a measuring chain, the isothermic intersection point of which is clearly defined and which possesses a slope of 59.1 mV/pH-unit owing to the inventive activation, maximum measurement uncertainties arise for different temperatures of the measurement substance, which have been tabulated in the following table:

| Meas. Temp. °C | Practically Employed pH-measuring Ranges | | |
|---|---|---|---|
| | pH=7.00 | pH=4.00 or 10.00 | pH=2.00 or 12.00 |
| 15 | 0.02 pH | 0.10 pH | 0.18 pH |
| 20 | 0.02 | 0.06 | 0.10 |
| 25 | 0.02 | 0.02 | 0.02 |
| 30 | 0.02 | 0.06 | 0.10 |

The above table is also valid if there is chosen instead of the fixed construction for 25°C, 37°C for instance.

As will be apparent from the table, notwithstanding fixed balanced measuring amplifiers there result in practice insignificant deviations of the measurement values from the most exact measurement values at 25°C. The alkali error is negligibly small within the employed pH-scale and the modern measuring chains. Mathematically the measurement uncertainty at 25°C amounts to 0.00pH; the values given take into account the diffusion potentials at the diaphragm of the reference electrode and other fluctuations of small value which occur in practice. A reduction in the slope can be again eliminated by cleaning the active portion of the measuring chain and the inventive activation. As a practical matter the slope reduction due to changes in the membrane glass only occurs after years.

Figure 2:
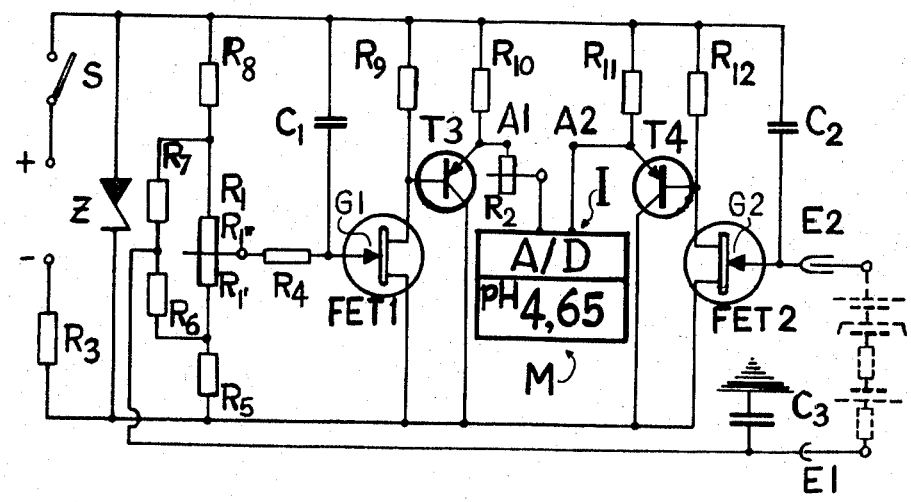
FIG. 2 is a circuit diagram of the amplifier circuit arrangement used in the apparatus of FIG. 1.

Turning now to FIG. 2 there is illustrated therein the circuit diagram of an amplifier which has proven itself particularly useful in the practical construction of the previously described measuring apparatus. The basic circuitry of the amplifier is known: a symmetrical differential amplifier possessing a respective field-effect transistor FET 1 and FET 2 as the input amplifier element. At the field-effect transistors FET 1 and FET 2 there are connected in cascade the transistors T3 and T4 of a further amplifier stage. The emitters of these transistors T3 and T4 form the outputs A1 and A2 of the differential amplifier. With the circuitry depicted in FIG. 2 the indicator device M indicates the measurement result in digital form and accordingly connected ahead of the indicator device M is an analogue digital converter A/D serving as signal processing element I. As contemplated by the invention the output A1 of the differential amplifier is connected with the output element I through the agency of a fixedly adjusted, variable resistor R2.

The measuring electrode wire of the measuring chain is directly connected via the input E2 with the gate electrode G2 of the field-effect transistor FET 2, whereas the reference electrode wire of the measuring chain is connected via the input E1 and a resistor network with the gate electrode G1 of the other field-effect transistor FET 1. This resistor network or resistance network will be seen to contain a fixedly balanced or matched voltage divider containing the partial resistors $R_5$ and $R_{1'}$ and $R_{1''}$ and $R_8$, wherein the partial resistors $R_{1'}$ and $R_{1''}$ are advantageously formed by a trimmer resistor $R_1$ in order to be able to easily undertake the initial calibration of the apparatus. The trimmer resistor $R_1$ is bridged by two series connected resistors $R_6$ and $R_7$, the junction point of which is connected with the input $E_1$. The slide or tap of the trimmer resistor $R_1$ is coupled by means of a resistor $R_4$ with the gate electrode G1 of the field-effect transistor FET 1. Additionally, the gate electrodes G1 and G2 of both field-effect transistors are connected without or by means of a respective capacitor $C_1$ and $C_2$ with the supply conductor connected to the positive pole or terminal of the operating voltage source.

The resistor $R_4$ together with the capacitor $C_1$ forms an RC-element and the capacitor $C_2$ together with the internal resistance of the measuring electrode of the measuring chain forms a further RC-element. Both of these RC-elements serve to dampen the switch-in pulses and additionally by virtue of such together with the field-effect transistors FET 1 and FET 2 and the transistors T3 and T4 the differential amplifier is rendered symmetrical. The switch S arranged at the storage vessel 2 is located at the supply conductor of the amplifier carrying positive potential. The operating voltage is stabilized by a Zener diode Z and a resistor $R_3$. The reference electrode input $E_1$ insulated from ground and chassis is connected in alternating current fashion to ground by means of capacitor $C_3$ in order to afford the possibility to be able to carry out measuring operations both for grounded as well as ungrounded sample substances, during operation of the electric circuitry with network power.

As explained above, the described apparatus is particularly used for measurement of pH-values. If there are connected ion selective measuring chains then it is possible to measure also other ion activities, such as p(Me)-values, electrode potentials (Redox potentials), and so forth. The individual apparatuses are only designed in each case for a single measuring magnitude. To carry out the measuring operation it is only necessary to remove the measuring chain from the storage vessel with the activiation or activation solution, whereupon the amplifier is immediately automatically turned-on, and as has been shown from a great number of trials exact and reproducible measurement values are indicated.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. An improved apparatus for rapid electrometric determination of ionic activities, especially the pH-value, p(Me)-value, or p(L)-value of substances in water containing systems by means of a measuring circuit, comprising an ion sensitive sensor which is an electrode-cell-assembly including
  a. a measuring electrode filled with a buffer solution having an ion sensitive member, a measuring electrode wire in said electrode filling and
  b. a reference electrode with a reference electrode wire which is immersed in an aqueous solution containing ions which determine the standard potential of said reference electrode;
an amplifier circuit arrangement including an indicator device connected to said electrodes;
said aqueous solution containing substances which provide a buffer capacity of said aqueous solution in addition to said ion determining the standard potential;
a storage means to hold said sensor when not in use;
an activation solution in said storage means within which said sensor is immersed when held therein;
said amplifier circuit arrangement including
  preset trimming resistor means to compensate for the asymmetry potential and the temperature dependency of said sensor and to determine the amplification factor of said amplifier circuit arrangement.

2. Apparatus as defined in claim 1, characterized in that the buffered aqueous solution containing the ions determining the standard potential of said reference electrode as well as said activation solution of said storage vessel contain a stabilization additive.

3. Apparatus as defined in claim 2, characterized in that said activation solution is said storage means and said buffered aqueous solution in which said reference electrode wire is immersed have the same chemical composition.

4. Apparatus as defined in claim 3, characterized in that the stabilization additives of the aqueous solution that is said activation solution comprises at least two of the following substances: alkali hydrogen phthalates, alkali tetraborates, alkali phosphates, alkali hydrogen phosphates, thymol, alkylesters of hydroxy benzoic acids, alkali benzoates, citric acid, acetic acid, monochloro acetic acid, alkali salts of acetic and monochloro acetic acid.

5. Apparatus as defined in claim 4, characterized in that the ions determining the standard potential of said reference electrode are chloride and that said reference electrode wire is a silver/silver chloride electrode wire.

6. Apparatus as defined in claim 5, characterized in that said aqueous solution into which the reference electrode is immersed contains silver chloride until saturation and also activation solution.

7. Apparatus as defined in claim 6, characterized in that said buffered aqueous solution as well as said activation solution contain additionally about 22 percent potassium chloride, about 2.0 percent monochloro acetic acid and about 2.8 percent sodium chloro acetate.

8. Apparatus as defined in claim 6, characterized in that said aqueous solution as well as said activation solution additionally contain about 23 percent potassium chloride, about 0.6 percent acetic acid, about 0.8 percent sodium acetate.

9. Apparatus as defined in claim 6, characterized in that said aqueous solution as well as said activation solution contain about 23.5 percent potassium chloride, about 0.34 percent potassium dihydrogen phosphate, about 0.36 percent disodium hydrogen phosphate and about 0.1 percent thymol.

10. Apparatus as defined in claim 1, characterized in that said measuring electrode is one having extremely high internal resistance.

11. Apparatus as defined in claim 1, characterized in that said measuring electrode is one having low internal resistance.

12. Apparatus as defined in claim 1, wherein said amplifier circuit arrangement comprises a bridge circuit incorporating two amplifiers, each amplifier being provided with a respective field-effect transmitter serving as an input amplifying element and an output, an output element electrically connected with said outputs of said amplifiers and serving for the analogue or digital processing of the output signals, the indicator device being coupled with said output element, and wherein the gate electrode of the field-effect transistor of one of said amplifiers of said bridge circuit is electrically coupled with a preset voltage divider means for compensating the chain asymmetry potential and its amplifier output is connected with said output element through the agency of a preset variable resistor for compensating the temperature dependency of the sensor and the amplification factor, said voltage divider means and said variable resistor containing said preset resistor means.

13. Apparatus as defined in claim 12, further including a capacitor for grounding the signal input of the amplifier of the bridge circuit containing said preset resistor means in order to be able to carry out measurements with grounded and ungrounded sample substances, during grounding of the apparatus housing.

14. Apparatus as defined in claim 12, further including an RC-element, and wherein the gate electrode of the field-effect transistor of said one amplifier of the bridge circuit is connected with said preset voltage divider by means of the resistor of said RC-element, and a capacitor connected with the gate electrode of the field-effect transistor of the other amplifier, said last-mentioned capacitor together with the resistance of the electrode of said measuring chain connected to said gate electrode of said other amplifier forming a second RC-element.

15. Apparatus as defined in claim 14, further including a closed housing within which there is housed said amplifier circuit arrangement together with said output element, said storage vessel for the activation solution and the sensor being arranged in said housing, said storage vessel being provided with a switch mechanism in order to switch-on said amplifier circuit arrangement upon removal of the sensor from said storage vessel and to switch-off said amplifier circuit arrangement upon insertion of said sensor into said storage vessel.

16. Apparatus as defined in claim 15, wherein said storage vessel includes a floor provided with a silicone rubber profile member possessing diaphragm means sealing in water-tight fashion said hollow compartment, and a switch arranged in said hollow compartment, said switch being actuatable when pressure is exerted upon said disphragm means.

* * * * *